United States Patent
Dmitriev (10) Patent No.: US 7,519,959 B1
(45) Date of Patent: Apr. 14, 2009

(54) HYBRID PROFILING TECHNIQUE

(75) Inventor: Mikhail A. Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

(21) Appl. No.: 10/988,043

(22) Filed: Nov. 12, 2004

(51) Int. Cl.
*G06F 9/44* (2006.01)
*G06F 9/45* (2006.01)

(52) U.S. Cl. .................. 717/128; 717/130; 717/158

(58) Field of Classification Search .............. None
See application file for complete search history.

(56) References Cited

U.S. PATENT DOCUMENTS

| | | | | |
|---|---|---|---|---|
| 5,450,586 A | * | 9/1995 | Kuzara et al. ............ | 717/124 |
| 5,710,724 A | * | 1/1998 | Burrows .................. | 714/34 |
| 6,971,091 B1 | * | 11/2005 | Arnold et al. ............ | 717/145 |
| 7,032,214 B1 | * | 4/2006 | Rodrigues et al. ........ | 717/130 |
| 2004/0003375 A1 | * | 1/2004 | George et al. ........... | 717/124 |

* cited by examiner

*Primary Examiner*—Chuck O Kendall
(74) *Attorney, Agent, or Firm*—Martine Penilla & Gencarella, LLP (57) ABSTRACT

A scheme for profiling function calls for an application is provided. The scheme includes tracking invocations of the application methods and executing a sampling thread concurrently with the application. The executing includes periodically activating the sampling thread to set a flag to a true state and checking if the flag is true for the tracked invocations for the application methods. If the flag is true, then the scheme includes recording a current timestamp for the application method and charging a time difference between the current timestamp and a previous timestamp to the application method. A computer readable media and a system for performing profiling for an application are also provided.

20 Claims, 7 Drawing Sheets

```
void main ( ) {
                    ← method entry ("main");  ⎤- 101a
foo ( );
                    ← method Exit ("main");   ⎤- 101b
} void foo ( ) {
                    ← method Entry ("foo")    ⎤- 101c
    - -
                    ← method Exit ("foo")     ⎤- 101d
}
```
— 100

| // Pure instrumentation-based profiling<br>void method Entry (method ID){<br>curTime = get Current Time( );<br>//Record curTime0=curTime<br>}<br><br><br>void method Exit (method ID){<br>curTime=get Current Time ( )<br>//Charge (curTime-curTime0) to<br>//methodID<br>} | Sampling thread sets the "take sample" flag every sampling interval.<br><br>//Hybrid instrumentation-sampling<br>void method Entry(methodID){<br>if (take sample){<br>curTime=getCurrentTime ( )<br>//Charge (curTime-curTime0)<br>//to method ID<br>curTime0 = curTime;<br>take Sample = false;<br>}<br>}<br>void method Exit (method ID)<br>//Do essentially the same<br>//thing as method Entry ( )<br>} |
|---|---|

HYBRID PROFILING TECHNIQUE

BACKGROUND

1. Field of the Invention

The present invention relates generally to profiling schemes, and more specifically to profiling schemes having a low overhead.

2. Description of the Related Art

Profiling is a general term for techniques that allow software developers to collect data on various characteristics of running computer applications. The collected data can then be used to understand what parts of the application being profiled (also called "target application") may be modified in order to improve the performance of the application. The term "CPU profiling" is used for those techniques that measure the time that an application spends in various parts of its code. These "parts" may be source code-level functions (subroutines, methods) of the application, basic blocks of code, individual source code lines, machine instructions, etc. A CPU profiling tool ultimately presents the user with the data (many formats are possible) showing which parts of the application code consumed what proportion of the total execution time.

In practice, and especially when working on large applications, developers often need to know not just in which parts of the code the application spent most of its time, but also something about why this happened. One category of data that often helps to answer that question, is the number of calls made to every function in the application. For example, the information that the application spent 50 percent of its execution time in function foo( ) is useful, but it is even more useful to know whether this time was spent in just a single call to foo( ), or in 1000 calls to foo( ). In the former case, the focus would be on how to improve foo( ) itself, whereas in the latter case, it also makes sense to think how to decrease the number of calls to foo( ). Additional data that can help in this situation is the knowledge of all contexts in which foo( ) was called. For example, it may be determined that foo( ) is called 10 times by function bar1( ), and 990 times by function bar2( ). If every call to foo( ) takes the same amount of time, it makes sense for the developer to look at the code of bar2( ), in order to decrease the number of calls to foo( ). Changing the number of calls to foo( ) from bar1( ) will not make a significant improvement and as such, does not require a developer to focus his efforts here.

Another example that illustrates the importance of recording of the number of calls to functions, is when the application contains a call that has far-reaching side effects. For example, just a single quick call to a special function that turns on/off security checks in many other functions, may dramatically affect the overall performance of the application. It is therefore important to know whether such calls have been made, and if so, how many calls have been made, even if they are relatively short. However, it turns out that recording both the exact number of calls and the exact timing information during profiling is quite computationally expensive under an instrumentation based profiling scheme.

In light of the foregoing, it is desirable to implement a scheme for an improved profiling technique that provides the benefits of instrumentation-based profiling (information about the exact number of calls) at an overhead that is much smaller than that for conventional instrumentation-based profiling.

SUMMARY

Broadly speaking, the present invention fills these needs by providing a low overhead solution for profiling an application. The present invention can be implemented in numerous ways, including as a process, an apparatus, a system, a device, or a method. Several embodiments of the present invention are described below.

In one embodiment, a method for profiling function calls and providing contexts in which the function calls are made in the target application is provided. The method initiates with injecting calls to instrumentation code within the profiled application. The method includes establishing a sampling interval through definition of a sleep period for a sampling thread. Then, the sampling thread is initiated and the profiled application is run. The method includes calling the instrumentation code through the injected calls. The calling includes recording a number of invocations for the function calls without taking a timestamp, wherein a flag is set to a true state and the sampling thread is suspended for the sleep period. In one embodiment, the sampling thread repeatedly does the following: sleeps for the above interval of time and then wakes up to set a special "take sample" flag associated with each target application's thread of execution, to true. Meanwhile, the target application runs and calls the instrumentation functions through the injected calls described above. Every time an instrumentation function is called, it checks the value of the above-mentioned "take sample" flag. If the value is true, the current timestamp is taken, and then the difference between the current and the previous timestamp is charged to the target application function that is on top of the call stack.

In another embodiment, a method for profiling function calls for an application is provided. The method includes tracking invocations for an application method of the application and executing a sampling thread concurrently with the application. The executing includes periodically activating the sampling thread to set a flag to a true state and checking if the flag is true for the tracked invocations for the application method. If the flag is true, then the method includes recording a current timestamp for the application method and charging a time difference between the current timestamp and a previous timestamp to the application method.

In yet another embodiment, a computer readable medium having program instructions for profiling function calls for an application is provided. The computer readable medium includes program instructions for tracking invocations for an application method of the application and program instructions for executing a sampling thread concurrently with the application. The program instructions for executing include program instructions for periodically activating the sampling thread to set a flag to a true state. Program instructions for checking if the flag is true for each of the tracked invocations for the application method are included. Program instructions for recording a current timestamp for the application method when the flag is recognized as being true and program instructions for charging a time difference between the current timestamp and a previous timestamp to the application method are provided.

In still yet another embodiment, a system for performing profiling for an application is provided. The system includes a microprocessor configured to execute an application and a memory. The system includes application profiling logic. The application profiling logic includes code injection logic configured to inject calls into both a prologue and an epilogue of methods within the application. The profiling logic also includes sampling thread logic configured to periodically set a flag to a first state according to a sampling period. Logic for determining a difference between a current timestamp associated with a current sampling period and a previous timestamp associated with a previous sampling period is included in the profiling logic. A bus interconnecting the microprocessor, the memory and the application profiling logic is provided.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

An invention is described for a system and method for profiling a target application through a technique that adds minimal overhead. It will be obvious, however, to one skilled in the art, that the present invention may be practiced without some or all of these specific details. In other instances, well known process operations have not been described in detail in order not to unnecessarily obscure the present invention.

In one embodiment, the target application may contain a function (a method, in the terminology of the Java programming language, that is used in the code samples used herein) such as the one presented below:

```
class C {
int x;
public void setX(int v) {x=v; }
}
```

Instrumenting this method for CPU profiling would mean that its code is effectively transformed into, for example, the following:

```
public void setX(int v) {
ProfilingClass.methodEntry("setX");
x=v;
ProfilingClass.methodExit("setX");
}
```

The special methods, methodEntry( ) and methodExit( ), need to do a number of things in order to record the profiling information about the call to setX( ). In particular, when a pure instrumentation approach is used, each of the special methods would have to read the current time and then somehow store it, which, can be quite expensive. For example, the gethrtime( ) system call on machines running the SOLARIS Operating System may take on the order of 0.1-0.5 microsecond depending on the processor/machine type and the OS version. The same-purpose call QueryPerformanceCounter( ) in the WINDOWS OS takes even more time. If a pure instrumentation-based profiling is used for call-intensive applications, the overhead of the above methodEntry( )/methodExit( ) calls can become large enough to be measured in "factors", rather than "percent". In other words, the instrumented application may run many times slower than the original one, and a significant proportion of the overhead is due to measuring and handling high-precision timestamps.

An alternative profiling method, called stack sampling, usually imposes a much smaller overhead. Stack sampling works by sampling (reading the contents) of the call stack(s) of the running application periodically, e.g., every 1-10 milliseconds. The difference between the moments the current and the previous samples have been taken is charged to the function that appears to be on top of stack at the moment when the sample is taken. The precision of the resulting timing data depends on the number of samples taken. For a large number of samples, e.g., on the order of $10^3$-$10^6$, the precision is usually acceptable. Furthermore, depending on the implementation, the overhead can be made quite small, e.g. within 1-10 percent.

However, stack sampling does not provide information about the number of calls to functions. Furthermore, stack sampling may simply miss calls to methods that are short and infrequent (e.g., the example with the call that turns on security, presented above). This is a fundamental drawback of the sampling approach, making it less useful for the developer that wants to understand reasons for the performance problems in their application. Additionally, sampling is more difficult to implement than instrumentation, since the sampling needs a sophisticated code that can "walk the stack", i.e. parse the machine memory area where contents of the stack for a given thread are located.

The embodiments of the present invention provide a tool capable of collecting, processing and presenting profiling data. The proposed technique makes calls to the special methodEntry( ) and methodExit( ) methods that are injected into the prologue and epilogue of the target application methods. The methodEntry( ) and methodExit( ) methods record the number of invocations for the target application methods. However, these methods do not take a timestamp at each invocation (as it is done when doing "classic" instrumentation-based profiling). Instead, a mechanism similar to that used in sampling-based profiling, is utilized. A separate concurrent thread of execution is created in the same process that executes the target application. This thread, referred to as a sampling thread, sleeps for a specified period of time, referred to as a sampling interval. The period of time is chosen to allow for a large number of samples to be taken over a time period that the application is running in order to capture the timing data. In one embodiment, the sampling interval is between about 1 millisecond (ms) and about 10 ms. In another embodiment, the number of samples can be determined individually for each profiled application, for example so that the total number of samples taken over the execution time of the application is not less than $10^3$ or some other suitable large number.

Once the sampling thread wakes up, it sets a flag, e.g., takeSample, in a special data structure referred to as Thread-Info. ThreadInfo is accessible to the methodEntry( )/methodExit( ) methods. ThreadInfo may be global if the target application is single-threaded, or there should be a separate instance of ThreadInfo per each thread of execution if the target application can be multithreaded. Once the takeSample flag is set to true in all ThreadInfo instances, the sampling thread goes back to sleep for the sampling period. This cycle repeats until the target application terminates, profiling is stopped by a user, or some other suitable means.

Both the methodEntry( ) and the methodExit( ) methods check the takeSample flag at each invocation. Only if this flag is true, which may be once per call if the target application methods are long-running, or once per many calls where the target application methods are short-running, does methodEntry( ) or methodExit( ) take the current timestamp. The difference between the previous and the current timestamp is charged to the method that is currently on top of the call stack as described in more detail below.

Figure 1:
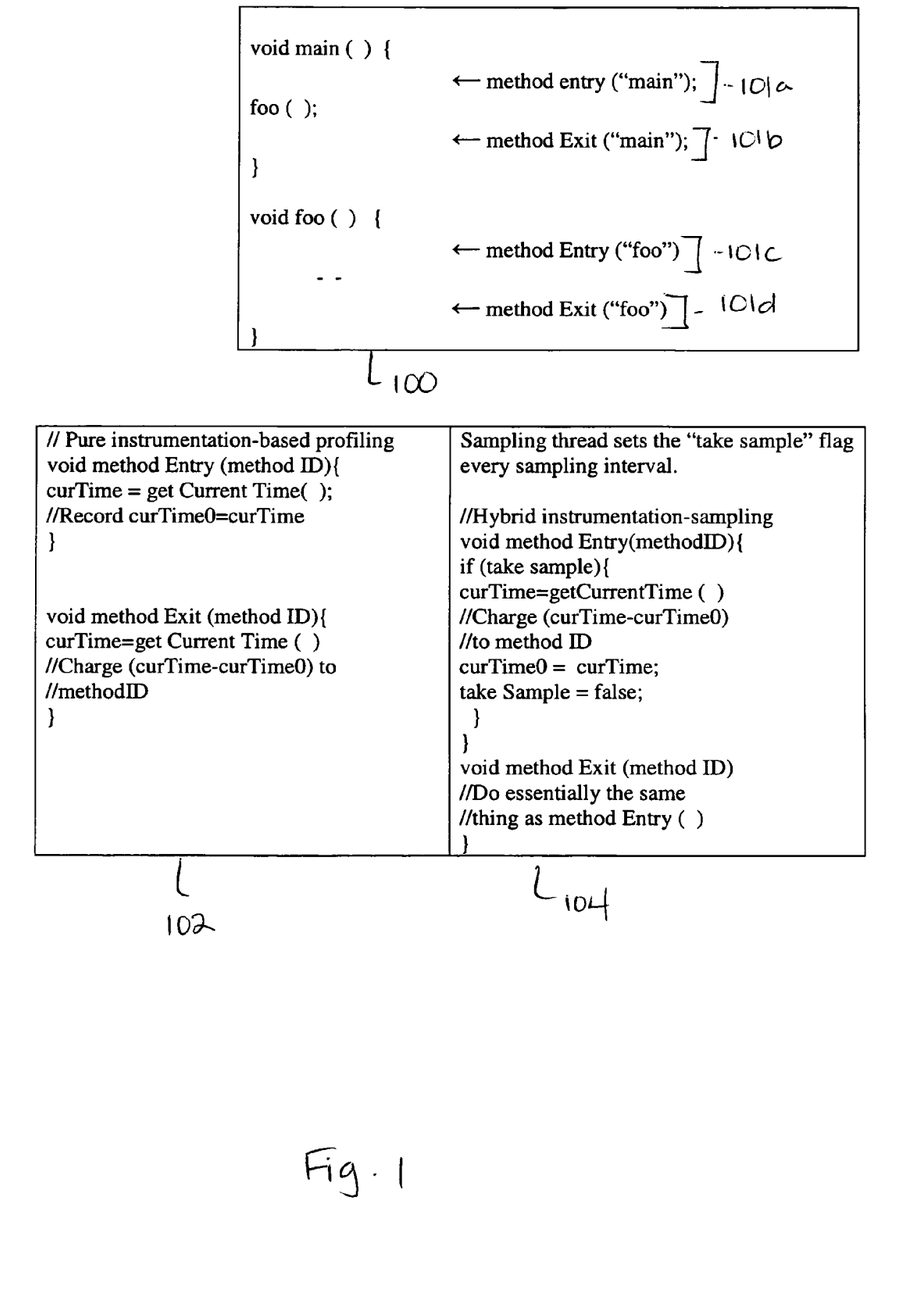
FIG. 1 is a simplified schematic diagram illustrating an exemplary method in which a hybrid instrumentation sampling profiling technique may be applied in accordance with one embodiment of the invention.

FIG. 1 is a simplified schematic diagram illustrating an exemplary code which can be profiled using a hybrid instrumentation sampling profiling technique in accordance with one embodiment of the invention. The exemplary code is presented in box 100. Lines 101*a* through 101*b* represent calls to special functions, that are injected in the prologue and epilogue of functions of the target application. In a pure instrumentation-based profiling technique the methodEntry( ) and methodExit( ) methods would have to read the current time and then somehow store the time. This pure instrumentation-based profiling functionality is illustrated in box 102. As mentioned previously, taking and storing timestamps can be quite expensive in terms of overhead, especially if a high resolution timer is used. The arithmetic instructions and transmission for these values are also quite expensive in terms of overhead. Thus, if instrumentation based profiling is applied to call-intensive applications, the overhead of the methodEntry( ) and methodexit( ) calls can become relatively large resulting in the instrumented application running much slower than the original application. A significant proportion of the overhead is due to measuring and handling high precision timestamps.

The method summarized in box 104 of FIG. 1 is an alternative profiling method that utilizes a hybrid instrumentation-sampling technique. Here, calls to the methodEntry( ) and methodExit( ) methods are injected into the prologue and epilogue of the topic target application similar to the pure instrumentation based profiling. The methodEntry( ) and methodExit( ) methods record the number of invocations for the target application. However, these methods do not take a timestamp at each invocation. Instead, a separate concurrent thread of execution is created in the same process that executes the target application. This thread, which may be referred to as a sampling thread, sleeps for a specified time period, i.e., a sampling interval. Once the sampling interval has completed, the thread wakes up, and sets a flag in a data structure. As mentioned above, the data structure is accessible to the methodEntry( )/methodExit( ) methods. If the target application is single threaded the data structure may be global. Alternatively, there may be a separate instance of this data structure for each thread of execution if the target application is multi-threaded.

In one embodiment, once the flag is set to true in all of the data structure instances, the sampling thread will go back to sleep again. The methodEntry( ) and methodExit( ) methods check the flag at each invocation. Only if the flag is true, i.e., has been set by the sampling thread, then the methodEntry( ) and methodExit( ) methods take the current timestamp and charge the difference between the previous and the current timestamp to a method that is currently on top of a stack. It should be appreciated that the flag may be set to true once per call if the target application methods are long running, or once per many calls in the case where the target application methods are not long running. As illustrated in the pseudo code of box 104 the takeSample flag is returned to a false state after the current time has been charged to the appropriate target application method. It should be appreciated that illustrated pseudo code for methodEntry( ) is essentially duplicated for methodExit( ) with one difference noted below.

The pseudo code below illustrates exemplary code describing the functionality of the hybrid profiling mechanism, which incorporates features from instrumentation based profiling techniques.

// A helper class. An instance of this class is allocated for each target application thread.

class ThreadInfo {
    boolean takeSample; // A flag indicating the end of the sampling period
    long prevTimeStamp; // Timestamp taken at previous sampling interval
}

// A call to this method is injected into each profiled method's prologue public void methodEntry(int methodId) {
    Threadinfo ti = getThreadInfoForCurrentThread( );
    // Record the invocation for the methodEntry's caller
    . . .
    if (ti.takeSample) { // The sampling period has ended
        long timeStamp = getCurrentTime( );
        long prevTimeStamp = ti.prevTimeStamp;
        long timeDiff = timeStamp − prevTimeStamp;
        // Charge the timeDiff to the method that is the caller
        // of the methodEntry's caller. That is, if we have a call chain:
        // foo( ) -> bar( ) -> methodEntry( )
        // charge timeDiff to foo( ).
        . . .
        ti.prevTimeStamp = timeStamp;
        ti.takeSample = false;
    }
}

// A call to this method is injected into each profiled method's epilogue public void methodExit(int methodId) {
    ThreadInfo ti = getThreadInfoForCurrentThread( );
    // Record the end of the invocation for the methodEntry's caller
    . . .
if(ti.takeSample) {
    long timeStamp = getCurrentTime( );
    long prevTimeStamp = ti.prevTimeStamp;
    long timeDiff = timeStamp−prevTimeStamp;
    // Charge the timeDiff to the methodEntry's caller.

```
// That is, if we have a call chain:
// foo( ) -> bar( ) -> methodExit( )
// charge timeDiff to bar( ).
...
    ti.prevTimeStamp = timeStamp;
    ti.takeSample = false;
    }
}
```

In order for methodEntry( ) to know its caller's caller, the profiler needs to maintain a simulated call stack. Elements (methodId's) are pushed into this stack in methodEntry( ) and "popped" in methodExit( ). It should be appreciated that maintaining the simulated stack is not very expensive. Furthermore, the stack enables the profiler to collect information about contexts in which calls are performed, as opposed to being limited to a simple flat profile.

A general layout for the methodEntry( )/methodExit( ) methods has been presented above. A more specific variation of this design, i.e., a variation that maintains the simulated call stack right in the ThreadInfo data structure, collects a simple flat profile in the flatprofile[ ] array, and collects the number of invocations in the invCount[ ] array, is presented through the pseudo code below. It should be noted that the described simple flat profile collection is presented for illustrative purposes only and one skilled in the art will recognize that a real-life profiler may use more sophisticated method and data structures for data collection.

```
class ThreadInfo { boolean takeSample;

long prevTimeStamp;

int stack[ ]; // Simulated call stack containing integer IDs of methods that are currently
    // on the real call stack of the target application.

int stackptr; // Simulated call stack pointer

}
public void methodEntry(int methodId) {
    ThreadInfo ti = getCurrentThreadInfo( );

// Record the invocation for the methodEntry's caller ti.stack[++ti.stackPtr] = methodId;

if (ti.takeSample) {
    long timeStamp = getCurrentTime( );
    long prevTimeStamp = ti.prevTimeStamp;
    long timeDiff = timeStamp-prevTimeStamp;
    // Charge the timeDiff to the method that is the caller
    // of the methodEntry's caller. That is, if we have a call
chain:
    // foo( ) -> bar( ) -> methodEntry( )
    // charge timeDiff to foo( ).
    flatProfile[ti.stack[ti.stackPtr - 1]] += timeDiff;
    ti.prevTimeStamp = timeStamp;
    ti.takeSample = false;
    }

}
public void methodExit(int methodId) {
    Threadinfo ti = getCurrentThreadInfo( );
    // Record the end of the invocation for the methodEntry's
caller
    ti.stackPtr--;
    invCount[methodId]++;
    if (ti.takeSample) {
        long timeStamp = getCurrentTime( );
        long prevTimeStamp = ti.prevTimeStamp;
        long timeDiff = timeStamp – prevTimeStamp;
        // Charge the timeDiff to the methodEntry's caller.
        // That is, if we have a call chain:
        // foo( ) -> bar( ) -> methodExit( )
        // charge timeDiff to bar( ).
        flatProfile[methodId] += timeDiff;
        ti.prevTimeStamp = timeStamp;
        ti.takeSample = false;
        }

}
```

Of course, more sophisticated variations of this design are possible or may be necessary if, for example, it is required that the methodEntry( )/methodExit( ) calls also record the contexts in which the invocations are performed. Call contexts may be recorded e.g. to represent the profiling results in the form of a call tree in addition to a flat profile.

Figure 2:
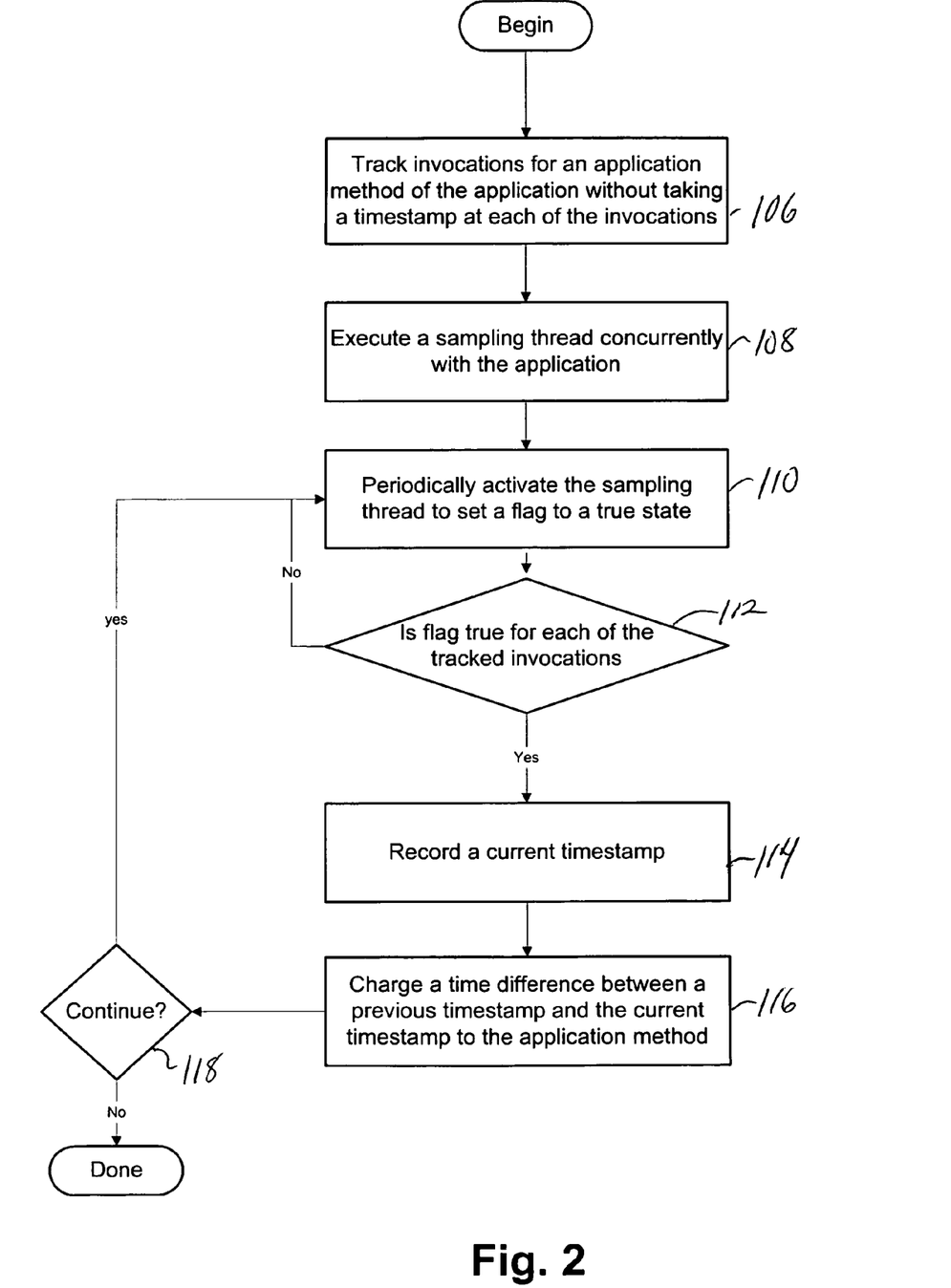
FIG. 2 is a flow chart diagram illustrating the method operations profiling function calls for an application in accordance with one embodiment of the invention.

FIG. 2 is a flow chart diagram illustrating the method operations profiling function calls for an application in accordance with one embodiment of the invention. The method initiates with operation 106 where calls to instrumentation methods are injected into the target application, such that invocations of the target application's methods are tracked. It should be appreciated that under the discussed profiling technique a timestamp is not taken at each of the invocations. The method then advances to operation 108 where a sampling thread is started such that it executes concurrently with the target application. Note that, depending on the capabilities of the particular runtime system and the profiling tool, and/or on the user's discretion, all three events, i.e., the start of the target application, the injection of the calls to instrumentation methods, and the start of the sampling thread, may happen simultaneously, or at different times. In one embodiment, in a system that supports injection of instrumentation calls at run time, such as the experimental JFluid profiler of the assignee, the two latter events may happen a after the start of the target application.

The method of FIG. 2 then proceeds to operation 110 where the sampling thread wakes up periodically to set a flag to a true state. A sampling interval defines the time period which the sampling thread sleeps for between activations. The flag, such as the takeSample flag mentioned above, is set to a true state when the sampling thread activates, i.e., wakes from the sleep state.

The method of FIG. 2 then moves to operation 112 where upon each invocation of the target application's methods, the fact of the invocation is recorded, and the takeSample flag is checked. Note that a separate instance of the flag should exist for each thread of execution if the target application is multi-threaded. If, in a given tracked invocation, the flag is found to be false, then a timestamp is not taken and the method returns to operation 110 and repeats as described above. If the flag is set to true, then the method advances to operation 114 where a current timestamp is recorded. The method then moves to operation 116 where a time difference between a previous timestamp and the current timestamp is charged to the application method. Further details on charging the time difference is provided below. The method then proceeds to operation 118 where it is determined whether or not to continue. If it is determined to continue the method returns to operation 110 and repeats as described above. If it is not determined to continue, then the method terminates.

In one embodiment, the time difference recorded in methodEntry( ) is charged to the method that is the caller of the one from which methodEntry( ) is called, and methodExit( )

charges the difference to its own caller method. For example, given the exemplary application:

The time difference associated with methodEntry( ) is charged to bar( ), i.e., the caller of the one from which methodEntry( ) is called. The time difference for methodExit( ) charges the difference to its own caller method, i.e., bar1( ). It should be appreciated that the time difference for methodExit is charged to its own caller method because at the moment when methodEntry( ) is called the application has just entered bar1( ). Thus, it is more likely that the application spent the previous time period executing the caller for bar1( ), i.e. bar( ). On the other hand, when the application exits bar1( ), it clearly has spent some time executing bar1( ). Accordingly, the difference between timestamps is charged to bar1( ).

Figure 3:
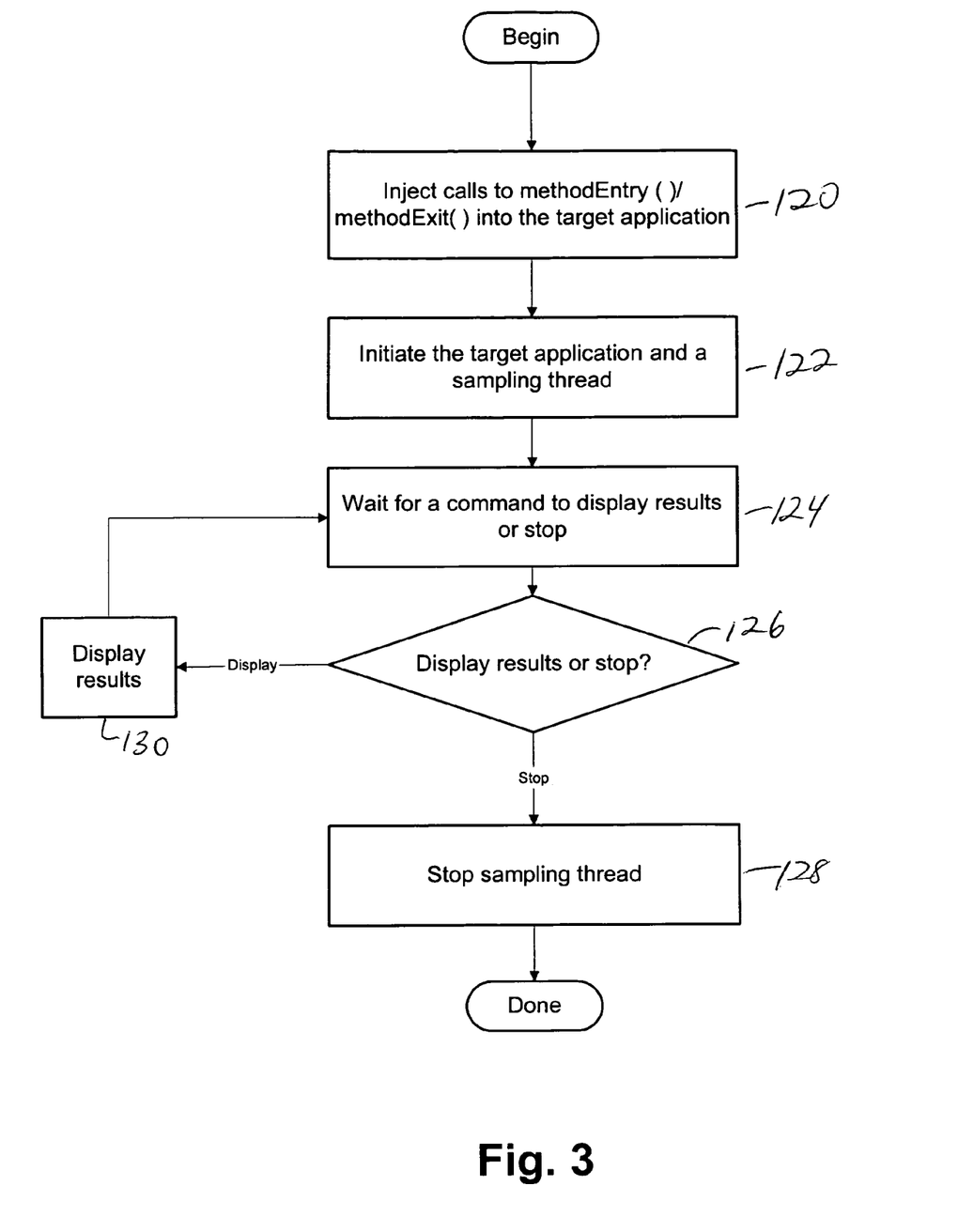
FIG. 3 is a flow chart diagram illustrating the method operations for implementing a hybrid instrumentation-sampling profiling technique in accordance with one embodiment of the invention.
Figure 5:
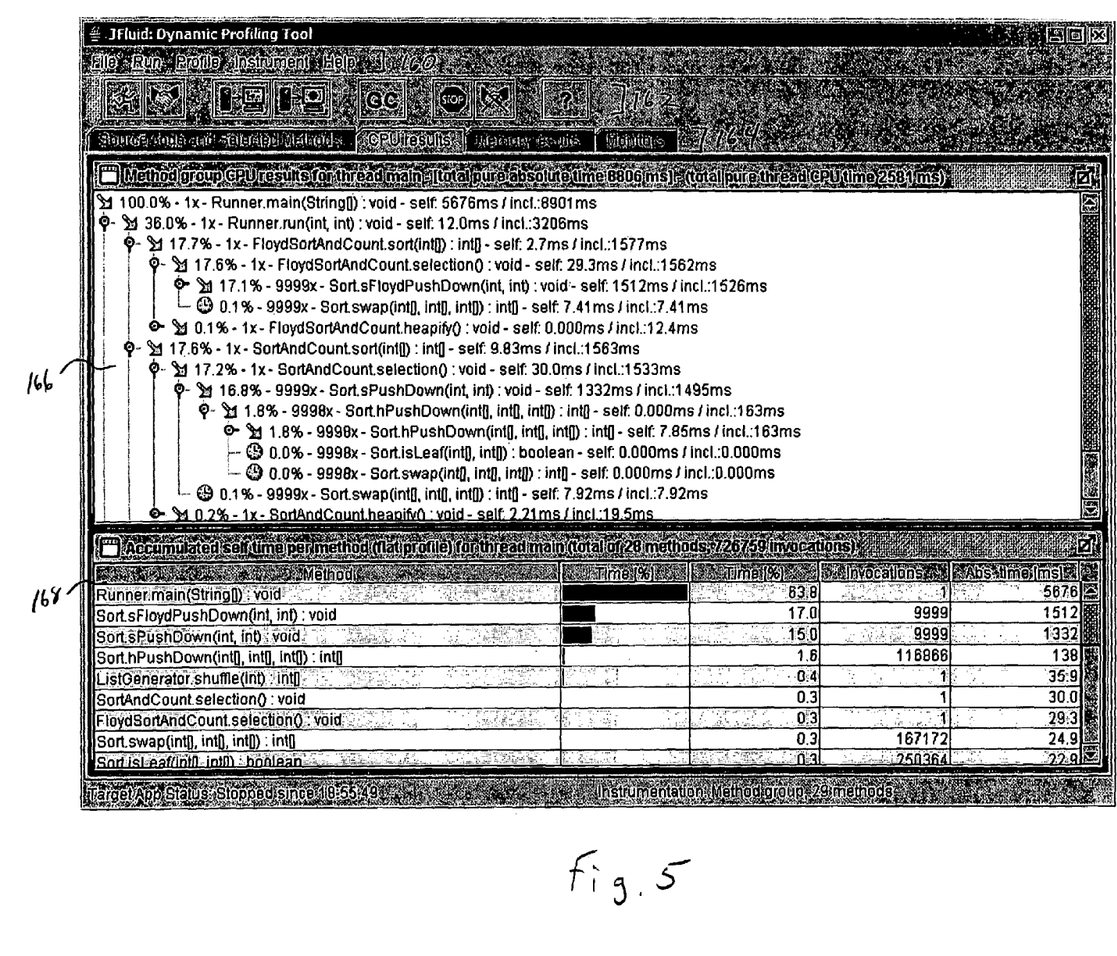
FIG. 5 is an exemplary graphical user interface (GUI) for the hybrid instrumentation-sampling profiling technique in accordance with one embodiment of the invention.

FIG. 3 is a flow chart diagram illustrating the method operations for implementing a hybrid instrumentation-sampling profiling technique in accordance with one embodiment of the invention. The method initiates with operation 120 where calls to methodEntry( )/methodExit( ) are injected into the target application. As discussed above, the methodEntry( ) and methodExit( ) methods check a flag at each invocation and when this flag is true, will record a timestamp. The difference between the previous and the current timestamps is then charged to the appropriate target application's method as discussed above. The method then advances to operation 122 where the target application and the sampling thread are initiated. As mentioned above, the order of these events does not necessarily have to be exactly as described here. The sampling thread will periodically activate and then return to a sleep state according to a sampling interval. The method then proceeds to operation 124 where a wait state is implemented for a command to display results or a command to stop. If a command to display results is received in operation 126, then the results are displayed in operation 130 and the method returns to operation 124 and repeats as described above. In one embodiment, the results are displayed as illustrated in FIG. 5. If a stop command is issued, then the sampling thread is stopped in operation 128. It should be noted that the embodiments described herein are not limited to the above-described technique of "on-line" results display. For example, to minimize possible disturbance of the target application execution, the results may be simply recorded, in the quickest possible way, into a disk file, and become available for display only after the target application terminates.

Figure 4:
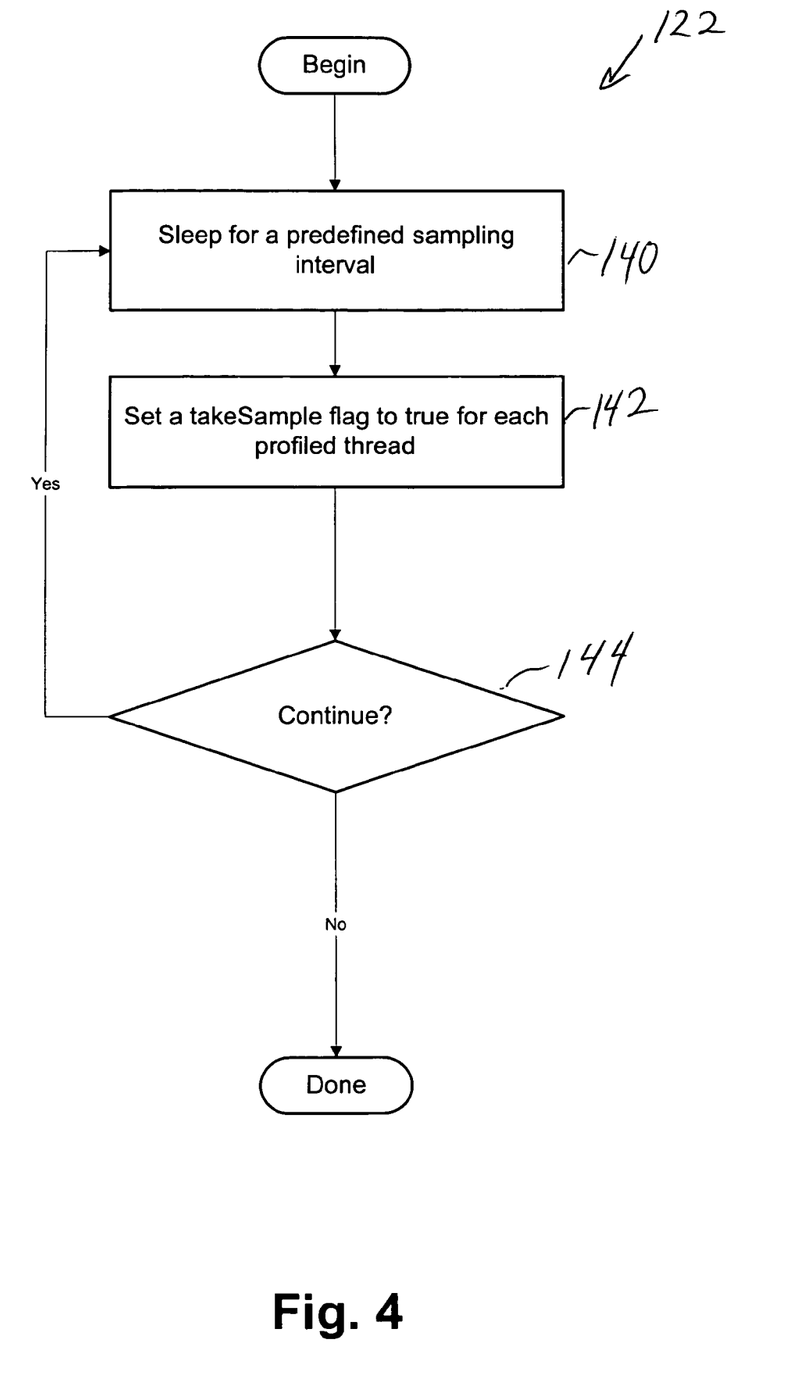
FIG. 4 is a flow chart diagram illustrating a more detailed explanation for the periodic activation of the sampling thread in accordance with one embodiment of the invention.

FIG. 4 is a flow chart diagram illustrating a more detailed explanation for the periodic activation of the sampling thread in accordance with one embodiment of the invention. It should be appreciated that once the sampling thread is started, it will sleep for a pre-defined sampling interval in operation 140. In one embodiment, the predefined sampling interval is between about 1 and 10 milliseconds. However, the sampling interval may be set to any suitable time period, for example to guarantee that at least a given number of samples is taken during the application execution time. Once the pre-defined sampling interval has completed, the sampling thread awakes and sets the takeSample flag, or a number of instances of the takeSample flag, to true in operation 142. The method then moves to operation 144 where it is determined whether or not to continue. If it is determined to continue, then the method returns to operation 140 and repeats as described above. If it is not determined to continue, then the method terminates.

FIG. 5 is an exemplary graphical user interface (GUI) for the hybrid instrumentation-sampling profiling technique in accordance with one embodiment of the invention. The user interface includes a calling context tree (CCT) region 166 and a flat profile region 168. Calling context tree region 166 illustrates for each line, i.e., each tree node, all method invocations in a particular context. As used herein, a context represents a unique sequence of method calls that lead to this method's invocation. The data displayed for each node is the percentage of time spent in this method's invocation in the given context, the number of its invocations, the method's name, the time spent in its invocations and the time spent in its invocations plus all other methods that it called itself. In flat profile region 168, all invocations for a given method in all contexts are aggregated into a single line. The numbers represent the percentage of the total application's execution time that is spent in the given method, the total number of its invocations and the total time spent in the method. As can be seen in tab bar 164 various tabs will navigate to alternative user interfaces such as, memory profiling discussed in application Ser. Nos. 10/783,683 and 10/893,069, wherein each of these applications are incorporated by reference in their entirety for all purposes. In addition, tool bars 160 and 162 further provide additional functionality and navigation options for selection through the GUI.

Figure 6:
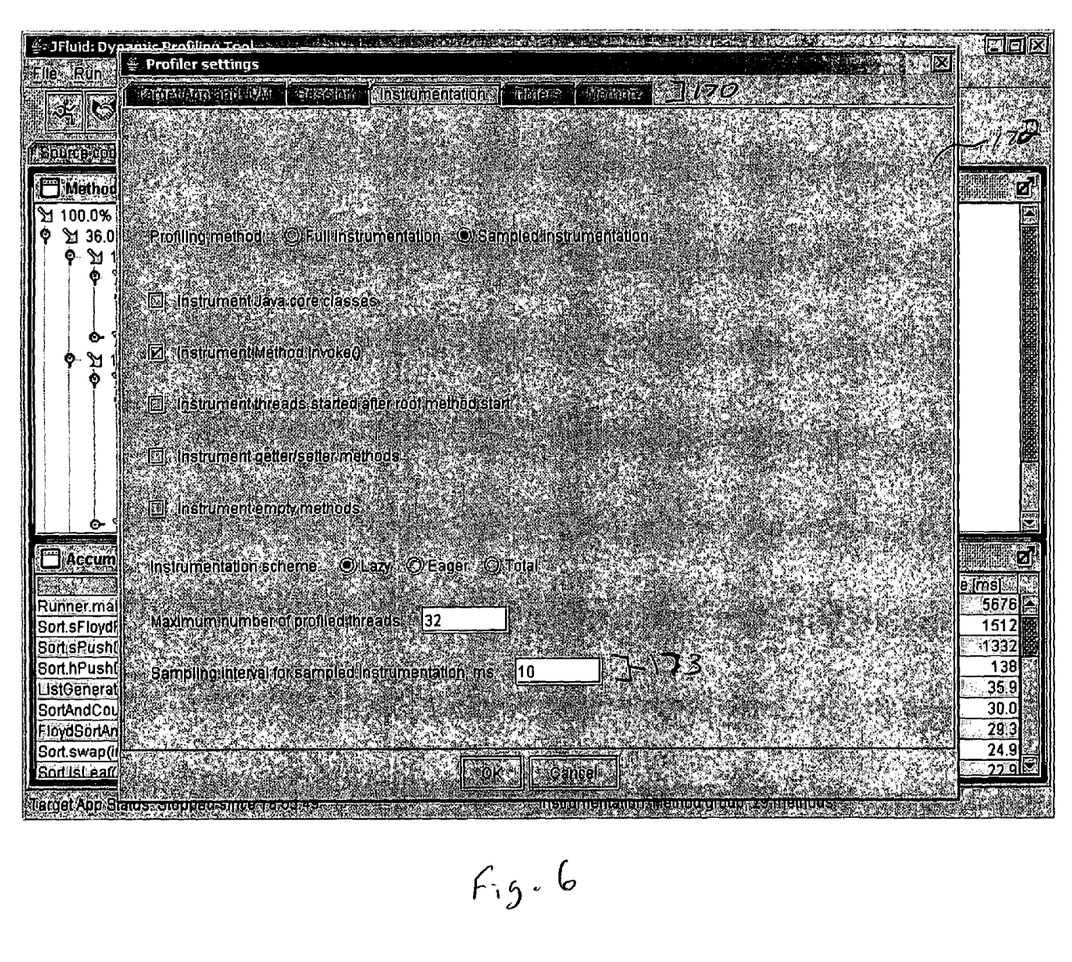
FIG. 6 is an exemplary graphical user interface that may be used to select a type of profiling technique and associated preferences in accordance with one embodiment of the invention.

FIG. 6 is an exemplary graphical user interface that may be used to select a type of profiling technique and associated preferences in accordance with one embodiment of the invention. In essence, graphical user interface 172 of FIG. 6 represents a reference panel where a user can choose the profiling method, e.g., a sampled instrumentation or a full instrumentation. In addition, the sampling interval may be set through user interface 172, as illustrated in line 173, where the sampling interval is set to 10 milliseconds. User interface 172 also includes tab selections 170 which offer various profiler settings to choose from.

Figure 7:
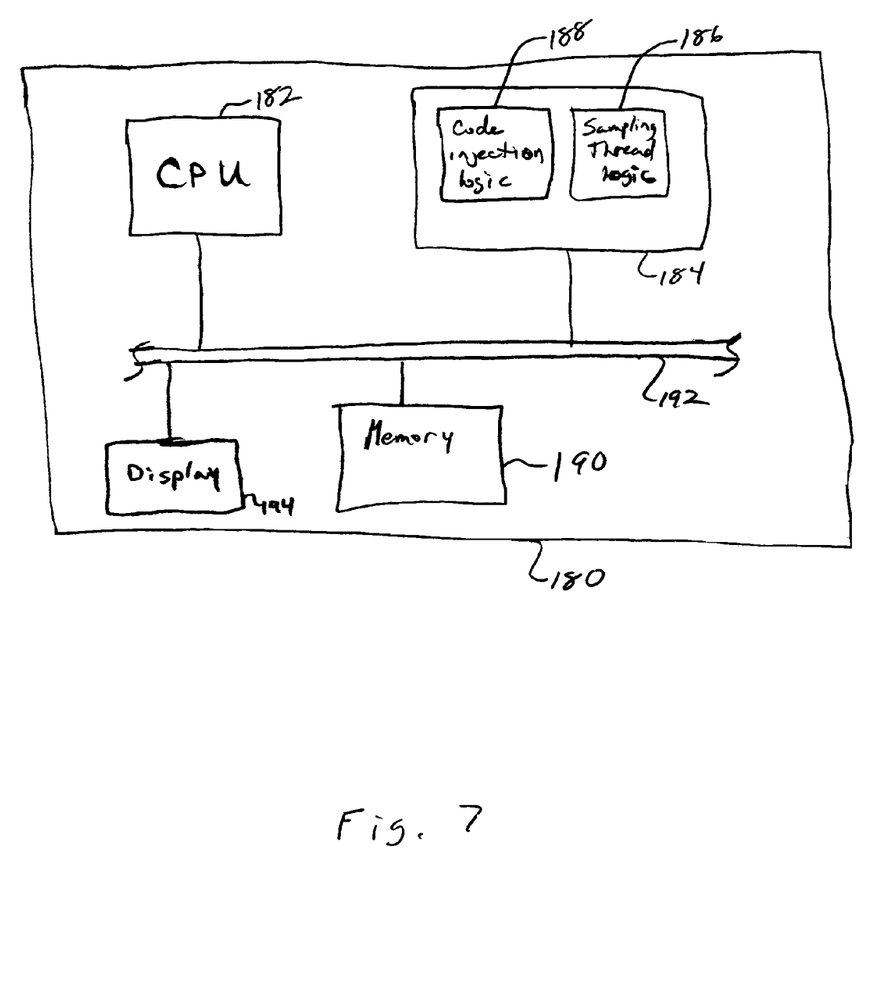
FIG. 7 is a simplified schematic diagram of the computing device having the ability to profile an application in accordance with one embodiment of the invention.

FIG. 7 is a simplified schematic diagram of the computing device having the ability to profile an application in accordance with one embodiment of the invention. Computing device 180 includes central processing unit (CPU) 182, memory 190, profiling logic 184, and bus 192 interconnecting the CPU, the profiling logic, and the memory. Profiling logic 184 includes code injection logic 188 and sampling thread logic 186. Code injection logic 188 injects the calls to the methodEntry( ) and methodExit( ) methods as described above. Sampling thread logic 186 accomplishes the functionality associated with the sampling thread, i.e., periodically awakening and setting the sample flag to a true state. In one embodiment, the logic mentioned above may be computer code stored within memory 190 that accomplishes the functionality described with reference to the flow charts of FIGS. 1 through 3. Computing device 180 includes a display panel 194 configured to present the results of the profiling application. For example, the results illustrated with reference to FIG. 5, as well as the preferences of FIG. 6, may be viewed through display panel 194. In one embodiment, thread Info data structure is stored in memory 190. Alternatively, the thread Info data structure may be stored in a dedicated memory area, e.g. within profiling logic 184.

In summary, the proposed technique combines conventional instrumentation-based profiling with a stack sampling technique in order to provide the necessary profiling information with a smaller the overhead. That is, calls to methodEntry( ) and methodExit( ) methods are injected into the prologue and epilogue of the target application methods. The methodEntry( ) and methodExit( ) methods record the number of invocations for the target application methods. However, these methods do not take a timestamp at each invocation. Instead, a separate thread of execution is created in the same process that executes the target application. This thread, i.e., a sampling thread, sleeps for the specified period of time (a sampling interval). Once the thread wakes up, it sets a flag, i.e., takeSample, in a special data structure, e.g., ThreadInfo. ThreadInfo is also accessible to the methodEntry( )/methodExit( ) methods. Once the takeSample flag is set to true in all ThreadInfo instances, the sampling thread returns to a sleep state. Both the methodEntry( ) and the methodExit( ) methods check the takeSample flag at each invocation. If this flag is true, then methodEntry( ) or methodExit( ) takes the current timestamp, and charges the difference between the previous and the current timestamp to the appropriate method. Thus, each invocation is tracked, however, due to the sampling interval, the flag is not set to true for each invocation and a timestamp will not be recorded at each invocation.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for profiling function calls and providing contexts in which the function calls are made for a profiled application, comprising method operations of:
    injecting calls to instrumentation code within the profiled application;
    running a sampling thread that wakes up periodically to set a flag to a true state;
    running the profiled application; and
    calling the instrumentation code through the injected calls, the calling including,
        charging time to a function call associated with the injected call when the flag is in a true state, the charging including taking a current timestamp, and
        setting the flag to a false state if time was charged.

2. The method of claim 1,
wherein charging time further includes,
    calculating the difference between the taken current timestamp and a last previously taken current timestamp, and
    charging the calculated difference to the function call associated with the injected call.

3. The method of claim 1, wherein the function call associated with the injected call is
    a first method, the first method being a caller of a second method, the second method being the method that called the instrumentation code.

4. The method of claim 1, wherein the function call associated with the injected call is
    a first method, the first method being the method that called the instrumentation code, wherein calling the instrumentation code is the last action executed by the first method.

5. The method of claim 1, further comprising:
    displaying results associated with the charged times to function calls of the profiled application in a calling context tree format.

6. The method of claim 1, further comprising:
    displaying results associated with the charged times to function calls of the profiled application in a flat profile format.

7. A method for profiling function calls for an application, comprising method operations of:
    executing a sampling thread concurrently with the application, the executing including periodically activating the sampling thread to set a flag to a true state; and
    tracking invocations for an application method of the application, the tracking including,
        recording a current timestamp if the flag is true, and
        charging a time difference between the current timestamp and a previous timestamp to the application method if the current timestamp was recorded.

8. The method of claim 7, wherein periodically activating the sampling thread to set a flag to a true state includes,
    defining a sampling interval setting a recurring time period for activating the sampling thread.

9. The method of claim 8, wherein the sampling interval is configured to result in an overhead of less than 10%.

10. The method of claim 7, wherein charging the time difference further includes:
    resetting the flag to false after charging the time difference.

11. The method of claim 7, further comprising:
    displaying the tracked invocations and the time difference in a calling context tree format.

12. A computer readable medium having program instructions for profiling function calls for an application, comprising:
    program instructions for executing a sampling thread concurrently with the application, the executing including program instructions for periodically activating the sampling thread to set a flag to a true state; and
    program instructions for tracking invocations for an application method of the application, the program instructions for tracking including, program instructions for recording a current timestamp for the application method when the flag is recognized as being true; and program instructions for charging a time difference between the current timestamp and a previous timestamp to the application method if the current timestamp was recorded.

13. The computer readable medium of claim 12, wherein the program instructions for periodically activating the sampling thread to set a flag to a true state includes, program instructions for defining a sampling interval setting a recurring time period for activating the sampling thread.

14. The computer readable medium of claim 12, wherein the program instructions for charging the time difference further includes:

program instructions for resetting the flag to false after charging the time difference.

15. The computer readable medium of claim 12, further comprising:

program instructions for displaying the tracked invocations and the time difference in a calling context tree format.

16. A system for performing profiling for an application, comprising:

a microprocessor configured to execute an application;

a memory;

application profiling logic, the application profiling logic including code injection logic configured to inject calls into both a prologue and an epilogue of methods within the application;

sampling thread logic configured to periodically set a flag to a first state according to a sampling period;

time charging logic invoked by an execution of an injected call, the time charging logic including, determining a difference between a current timestamp associated with a current sampling period and a previous timestamp associated with a previous sampling period when the flag is at a first state, and charging time to a method associated with the executed injected call if the difference was determined; and a bus interconnecting the microprocessor, the memory and the application profiling logic.

17. The system of claim 16, further comprising:

a display panel in communication with the microprocessor through the bus, the display configured to present a graphical user interface (GUI) enabling selection of the sampling period.

18. The system of claim 16, wherein charging time to a method further includes, logic for charging the determined difference to a first method, the first method being a caller of a second method, the second method calling one of the injected calls.

19. The system of claim 16, wherein the time charging logic further includes, logic for setting the flag to a second state after charging time to the method.

20. The system of claim 16, wherein the profiling logic is incorporated into the memory.

* * * * *